United States Patent [19]
Habu et al.
[11] 3,981,857
[45] Sept. 21, 1976

[54] GELATIN HARDENING PROCESS

[75] Inventors: Teiji Habu; Hisashi Yamaguchi; Tsuneo Wada; Takashi Sasaki; Hiroki Ishii; Takayoshi Omura; Hiroyuki Inokuma, all of Hino, Japan

[73] Assignee: Konishiroku Photo Industry Co., Ltd., Tokyo, Japan

[22] Filed: Mar. 18, 1974

[21] Appl. No.: 452,374

[30] Foreign Application Priority Data

Mar. 19, 1973 Japan ............ 48-30948
Mar. 19, 1973 Japan ............ 48-30949

[52] U.S. Cl. ............ 260/117; 96/111; 260/343.6

[51] Int. Cl.² ............ C09H 7/00

[58] Field of Search ............ 260/117, 343.6; 96/111, 96/50 PT, 67; 106/125

[56] References Cited

UNITED STATES PATENTS

| | | | |
|---|---|---|---|
| 2,585,596 | 2/1952 | Stanton | 96/111 |
| 3,110,597 | 11/1963 | Gates et al. | 96/111 |
| 3,291,624 | 12/1966 | Jeffreys et al. | 106/125 |
| 3,531,292 | 9/1970 | Emmi | 260/117 X |

*Primary Examiner*—Paul R. Michl
*Attorney, Agent, or Firm*—Haseltine, Lake & Waters

[57] ABSTRACT

A process for hardening gelatin which comprises reacting photographic gelatin with a compound of the general formula

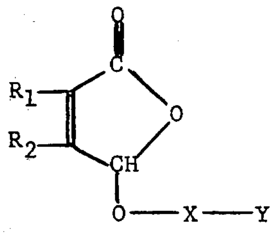

wherein $R_1$ and $R_2$ individually are halogen, an aryloxy group which may have substituents, or an arylthio group which may have substituents; X is a simple bond, an alkylene group which may have substituents —CO, —CO—$R_5$—CO— (in which $R_5$ is an alkylene group which may have substituents) or —$R_6$—(O—$R_6$-)$_n$— (in which $R_6$ is an alkylene group which may have substituents and n is a positive integer); an Y is a saturated or unsaturated hydrocarbon group which may have substituents, or a group

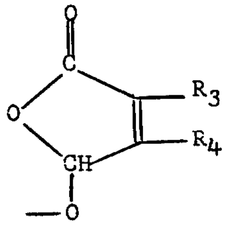

(in which $R_3$ and $R_4$ individually are halogen).

3 Claims, No Drawings

GELATIN HARDENING PROCESS

This invention relates to a process for hardening gelatin by use of a novel hardener, and particularly to a gelatin hardening process suitable for hardening gelatin films of light sensitive silver halide photographic materials.

Generally, light-sensitive silver halide photographic materials are prepared by forming on a proper support, such as glass, paper or synthetic resin film, various layers such as silver halide photographic emulsion layer, filter layer, inter layer, protective layer, sub layer, backing layer, antihalation layer, etc. These photographic layers consist of so-called gelatin films composed mainly of gelatin. Accordingly, the physical properties of the photographic layers consisting of gelatin films depend chiefly on those of gelatin. However, gelatin itself has such properties as being low in melting point, high in water swellability and low in mechanical strength. These properties are extremely undesirable as the physical properties of layers of light-sensitive silver halide photographic materials. It has therefore been an ordinary practice hitherto that various hardeners are reacted with gelatin to crosslink the hardeners with amino, carboxyl, amide and the like functional groups in the gelatin molecules, thereby improving the physical properties of gelatin. As such hardeners, there have been known from old times inorganic hardeners comprising polyvalent metal salts such as chromium alum, chromium trichloride and the like chromium salts or aluminum salts, and organic hardeners such as formalin, glyoxal and acrolein and their derivatives. Photographically, however, these hardeners have various drawbacks, and most of them bring about many such disadvantages as, for example, they are strong in desensitizing action, promote the formation of fog, are too slow in hardening action to be put into practical use, disturb the color forming ability of couplers used in color emulsions, and are excessively rapid in hardening action to make the preparation of light-sensitive photographic materials difficult or, conversely, cannot display desired hardening effects unless incubated sufficiently.

Moreover, with recent speedy progress of industries, quick processing of light-sensitive photographic materials has been required. In order to meet such requirement, not only photographic materials themselves have been improved so as to be in conformity to quick processing, but also processing solutions have been improved so as to be suitable for treatment of such photographic materials. For example, in order to make quick penetration of processing solutions possible, photographic materials have been increased in amount of silver halide and decreased in amount of gelatin so as to be made thinner, with the result that not only the photographic materials are increased in fog but also the film properties thereof are further deteriorated. Furthermore, with propagation of automatic processing machines, photographic materials are required to have film properties sufficiently high in mechanical strength so as to be withstandable severe mechanical abrasion. In addition, with spread of high temperature-short period treatment by use of strong processing solutions, photographic materials are required to have strong film properties which do not injure the photographic properties.

Accordingly, most of the conventional hardeners bring about various disadvantages with progress of quick processing of light-sensitive photographic materials. For example, if only the amount of hardener is increased in order to obtain stronger physical properties of gelatin film, not only the hardener causes increase of desensitization and fogging but also the covering power is lowered. Even if the hardness of film is increased, the film becomes so brittle that the photographic material is difficultly subjected to automatic processing machine.

An object of the present invention is to provide a hardener which brings about no such disadvantages as mentioned above.

Another object of the invention is to provide a process for hardening gelatin, particularly gelatin films of light-sensitive silver halide photographic materials, by use of the above-mentioned hardener.

These objects can be accomplished by using as the hardener a compound having the general formula,

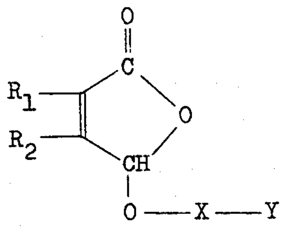

wherein $R_1$ and $R_2$ individually are halogen atom, an arloxy group which may have substituents, or an arylthio group which may have substituents; X is a simple bond, an alkylene group which may have substituents, —CO—, —CO—$R_5$—CO— (in which $R_5$ is an alkylene group which may have substituents) or —$R_6$—(O—$R_6$)$_n$— (in which $R_6$ is an alkylene group which may have substituents and $n$ is a positive integer); and Y is a saturated or unsaturated hydrocarbon group which may have substituents, or a group

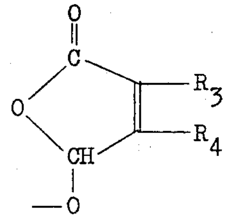

(in which $R_3$ and $R_4$ individually are halogen atoms.)

One prominent group of the compounds usable herein are those which have the general formula

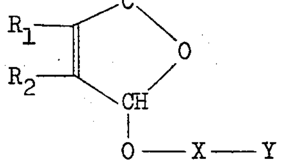

wherein $R_1$ represents halogen atom, an aryloxy group which may have substituents, or an arylthio group which may have substituents, $R_2$ represents halogen atom, X represents —CO— or a simple bond, and Y represents a saturated or unsaturated alkyl group which may have substituents or an aryl group which may have substituents, provided that when both $R_1$ and $R_2$ are respectively halogen atoms and X is —CO—, Y represents a saturated or unsaturated alkyl group which may have substituents.

Another prominent group of the compounds usable in the present invention are those which have the general formula

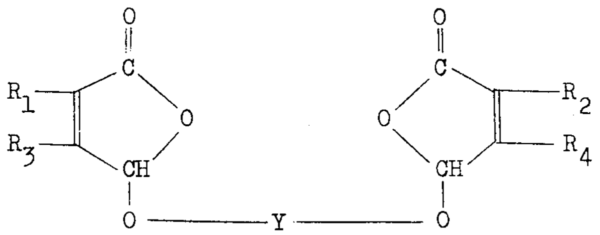

wherein $R_1$ and $R_2$ individually represent halogen atom, an aryloxy group which may have substituents or an arylthio group which may have substituents, $R_3$ and $R_4$ individually represent halogen atom, and Y represents an alkylene group which may have substituents, $—CO—R_5—CO—$ in which $R_5$ represents an alkylene group which may have substituents or an arylene group which may have substituents, or $—R_6—(O—R_6)_n—$ in which $R_6$ represents an alkylene group, and n represents a positive integer.

When at least one of the compounds having the above-mentioned general formula is used as the hardener, gelatin in a light-sensitive photographic material can successfully be hardened without causing any increase in desensitizing action and fog, even in the case where the photographic material has been made thinner by decreasing the amount of gelatin. Even when the said photographic material is subjected to high temperature processing using strong processing solutions, the compound used as the hardener in the present invention can display not only such excellent hardening action as to withstand the heat treatment without causing any increase in fog but also such hardening action as to sufficiently withstand mechanical abrasion encountered in automatic processing machines. These hardening actions are displayed so quickly that when the compound is incorporated into, for example, a coating liquid for forming a gelatin film, desired hardening can be quickly attained immediately after coating of the liquid. Moreover, the compound scarcely causes the so-called post-hardening due to spontaneous incubation or heat treatment to make it possible to obtain a light-sensitive silver halide photographic material stabilized in quality.

Typical examples of the compounds having the aforesaid general formula are shown below, but compounds usable in the present invention are not limited to these.

1.

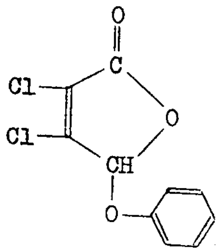

2.

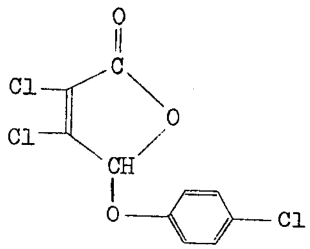

3.

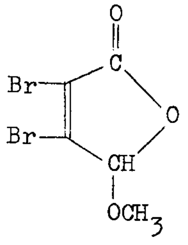

4.

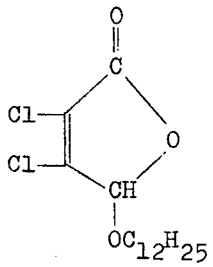

5.

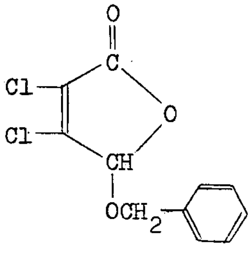

6.

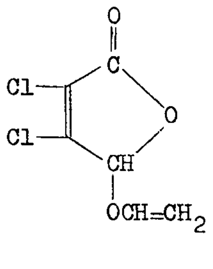

7.

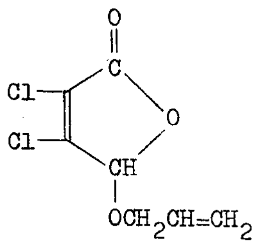

8.
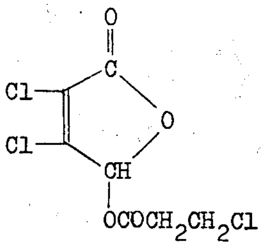
9.
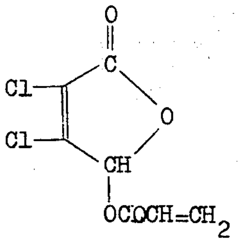
10.
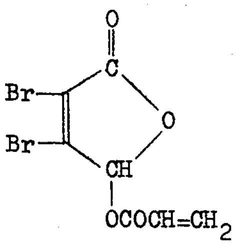
11.
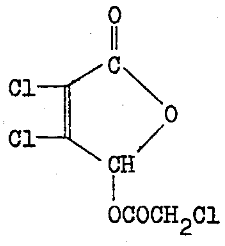
12.
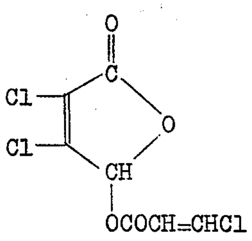
13.
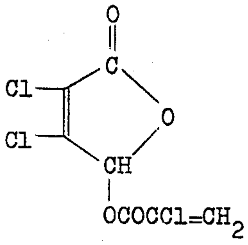
14.
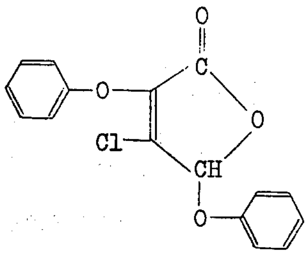
15.
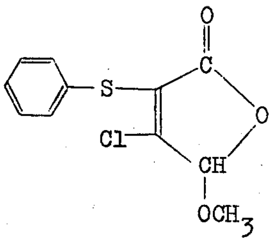
16.
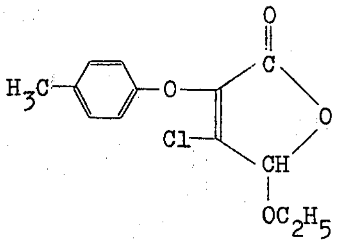
17.
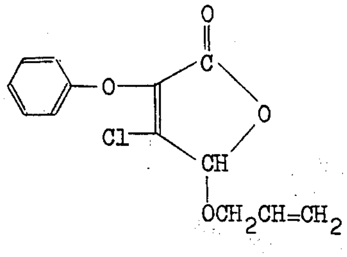
18.
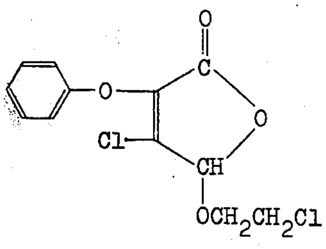
19.
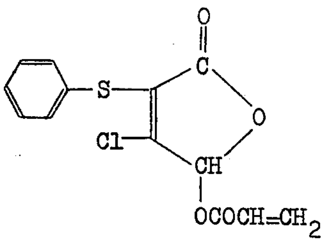

20.
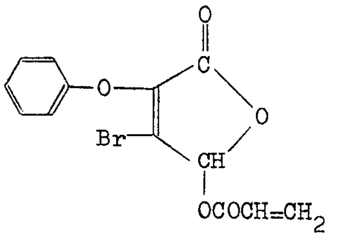
21.
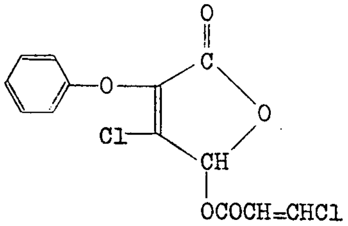
22.
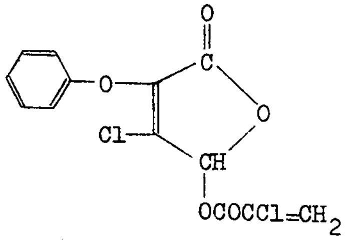
23.
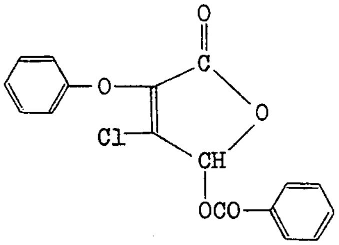
24.
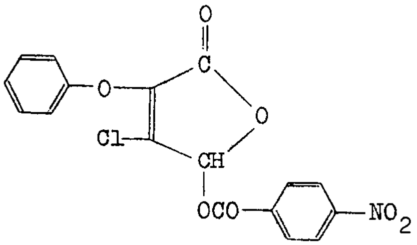
25.
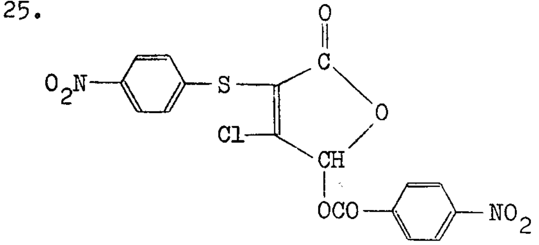
26.
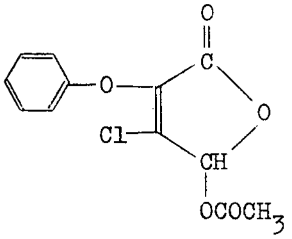
27.
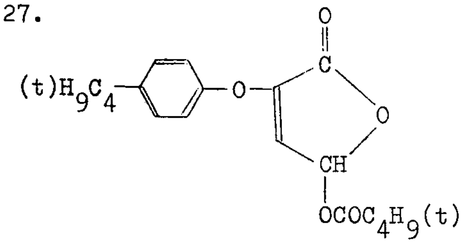
28.
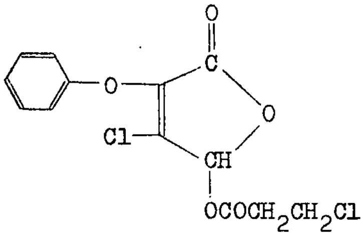
29.
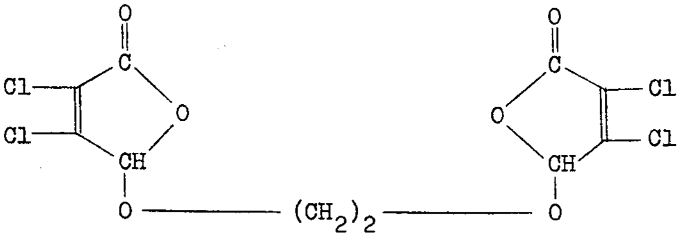
30.
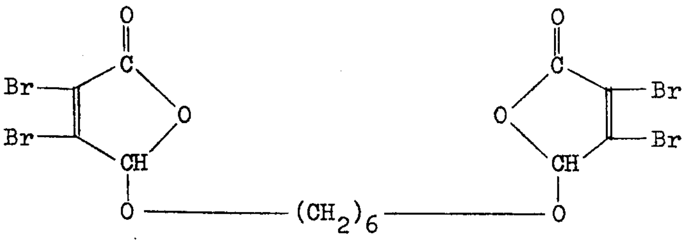

31.
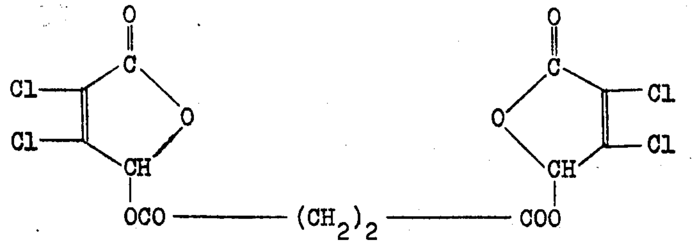
32.
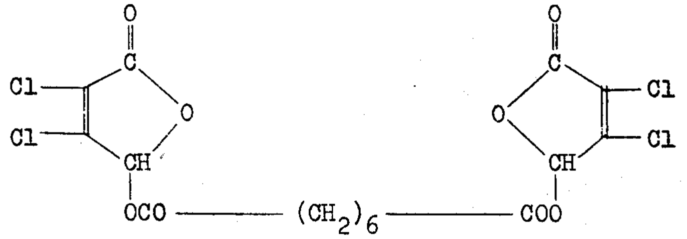
33.
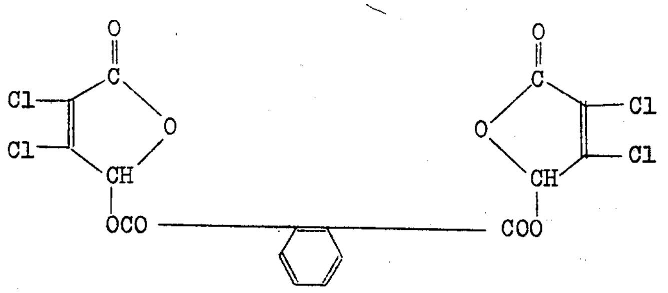
34.
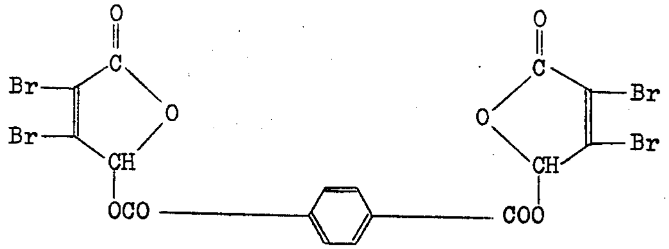
35.
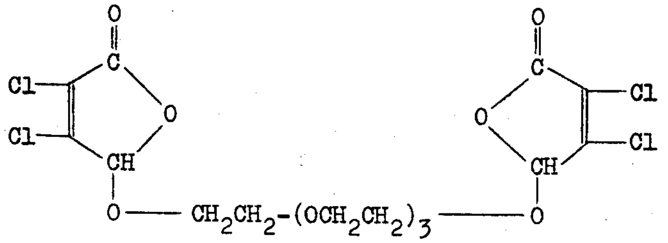
36.
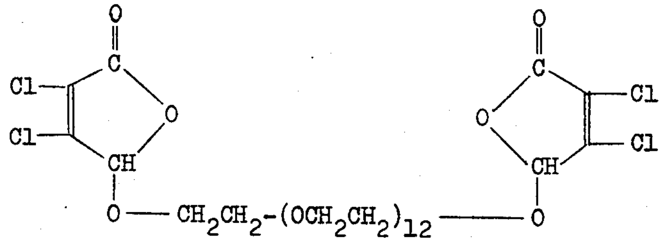
37.
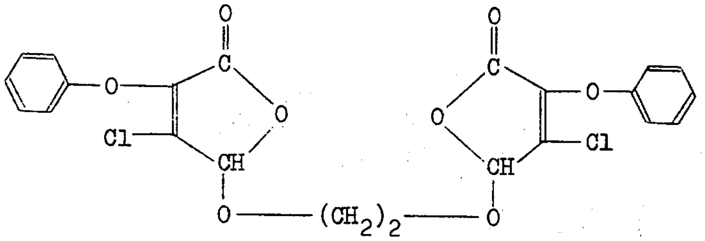

38.
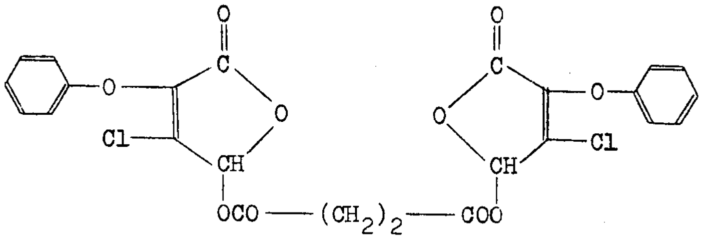
39.
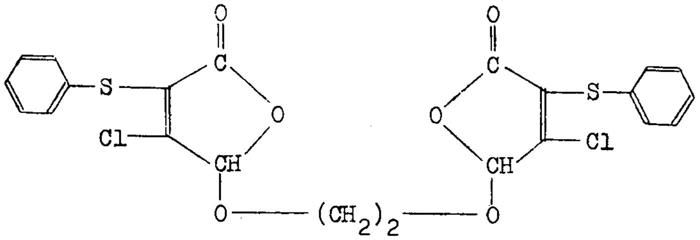
40.
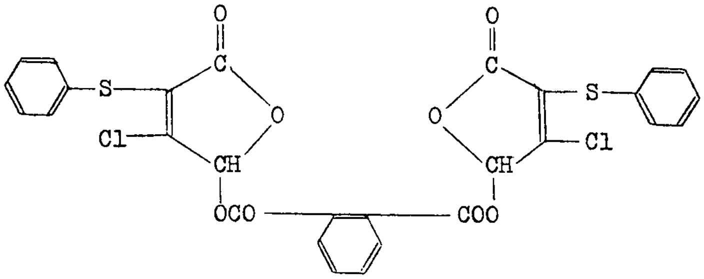
41.
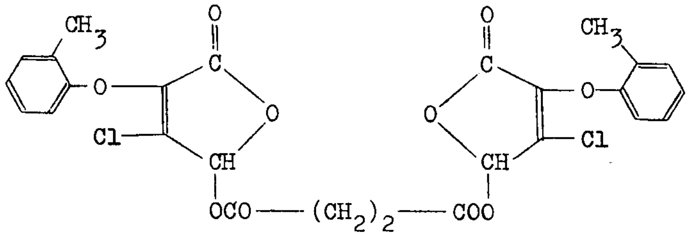
42.
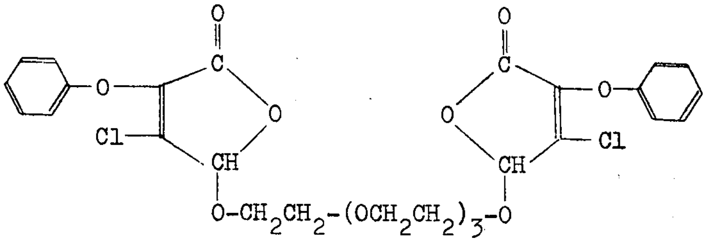
43.
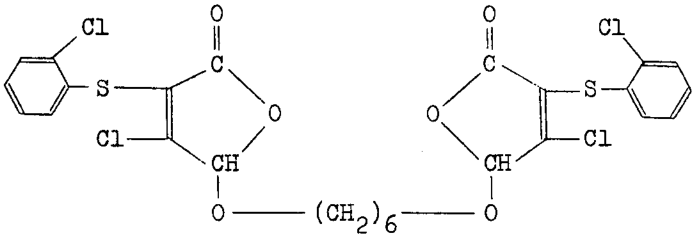
44.
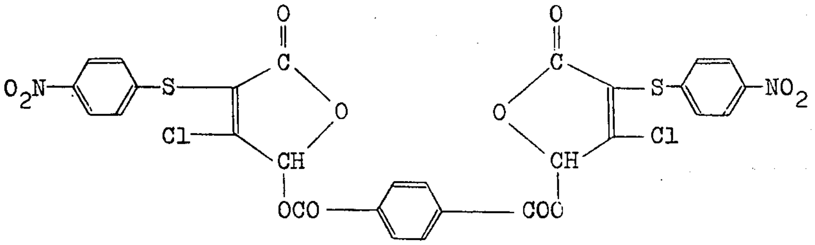

45.

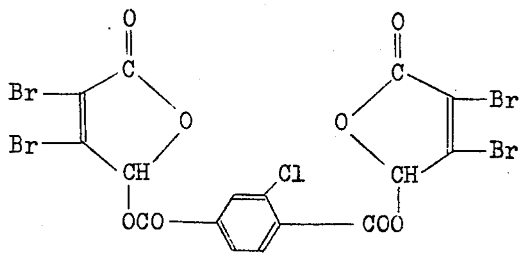

46.

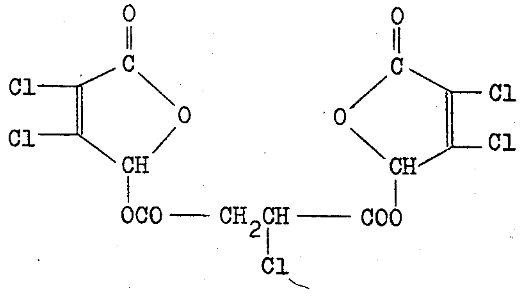

47.

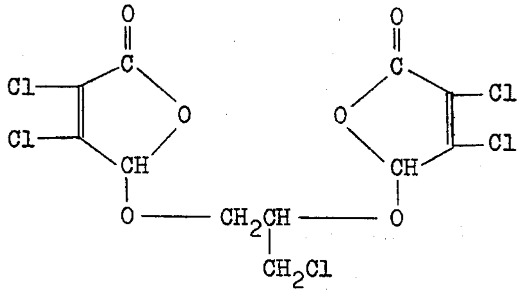

48.

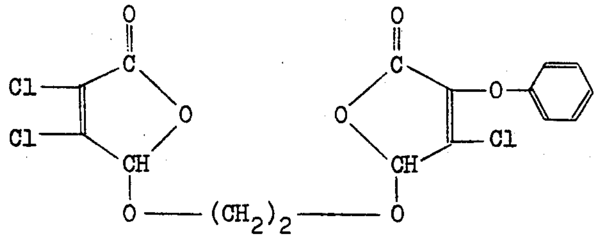

Typical procedures for synthesizing the compounds used in the present invention are explained below with reference to synthesis examples.

Synthesis Example 1 (Synthesis of the exemplified compound 4)

A solution of 16.9 g of mucochloric acid and 37.2 g of n-dodecyl alcohol in 100 ml of benzene is charged with 0.5 ml of concentrated sulfuric acid and is then refluxed for 6 hours in a reactor. The reaction liquid is washed with water, and the benzene layer separated is dehydrated over sodium sulfate. Thereafter, the benzene is distilled off, and the residue is distilled under reduced pressure to obtain 11.8 g of the desired compound.

Elementary analysis for $C_{16}H_{26}Cl_2O_3$

| | C | H | Cl |
|---|---|---|---|
| Calculated (%): | 56.97 | 7.79 | 21.02 |
| Found (%): | 56.01 | 7.65 | 20.94 |

Synthesis Example 2 (Synthesis of the exemplified compound 9)

A mixture of 16.9 g of mucochloric acid and 18.1 g of acrylic acid chloride is charged with 2 g of copper powder as a polymerization inhibitor and then is refluxed for 2 hours, whereby reaction proceeds vigorously while discharging hydrogen chloride. After completion of the reaction, the reaction liquid is distilled to remove unreacted acrylic acid chloride, and the residue is then distilled under reduced pressure to obtain 12.8 g of the desired compound.

Elementary analysis for $C_7H_4Cl_2O_4$

| | C | H | Cl |
|---|---|---|---|
| Calculated (%): | 37.70 | 1.81 | 31.80 |
| Found (%): | 36.88 | 1.76 | 31.23 |

Synthesis Example 3 (Synthesis of the exemplified compound 16)

A solution of 24 g of 2-(p-methylphenoxy)-3-chlormalealdehydic acid and 10 g of ethyl alcohol in 100 ml of benzene is charged with 0.5 ml of concentrated sulfuric acid, and is then refluxed for 8 hours in a reactor. The reaction liquid is washes with water, and the benzene layer separated is dehydrated over sodium sulfate. The benzene layer thus dehydrated is distilled to remove the benzene, and the depositing solid is recrystallized from ethanol to obtain 18 g of the desired compound.

Elementary analysis for $C_{13}H_{13}ClO_4$

| | C | H | Cl |
|---|---|---|---|
| Calculated (%): | 58.11 | 4.88 | 13.20 |
| Found (%): | 57.94 | 4.73 | 13.15 |

Synthesis Example 4 (Synthesis of the exemplified compound 23)

A mixture of 22.7 g of 2-phenoxy-chloromalealdehydic acid and 28 g of benzoyl chloride is refluxed for 3 hours, whereby reaction proceeds vigorously while discharging hydrogen chloride. After completion of the reaction, the reaction liquid is distilled to remove unreacted benzoyl chloride, and the resulting solid is recrystallized from ethanol to obtain 24.4. g of the desired compound.

Elementary analysis for $C_{17}H_{11}ClO_5$

| | C | H | Cl |
|---|---|---|---|
| Calculated (%): | 61.74 | 3.35 | 10.72 |
| Found (%): | 61.36 | 3.29 | 10.64 |

Synthesis Example 5 (Synthesis of the exemplified compound 29)

A solution of 40 g of mucochloric acid and 6.2 g of ethylene glycol in 200 ml of benzene is refluxed for 6 hours in a reactor. After completion of the reaction, the reaction liquid is washed successively with a 10% aqueous potassium carbonate solution and with water. The benzene layer separated is concentrated to dryness. The resultant white solid is recrystallized from ethyl alcohol-acetone to obtain 14.8 g of the desired compound.

Elementary analysis for $C_{10}H_6Cl_4O_6$

| | C | H | Cl |
|---|---|---|---|
| Calculated (%): | 33.00 | 1.66 | 38.97 |
| Found (%): | 29.86 | 1.72 | 38.90 |

Synthesis Example 6 (Synthesis of the exemplified compound 33)

A mixture of 20 g of mucochloric acid and 10 g of phthalic acid chloride is heated at 150°C. for 2 hours, and is then allowed to cool. The resulting solidified product is washed with water and, thereafter, recrystallized from ethyl alcohol to obtain 12.3 g of the desired compound.

Elementary analysis for $C_{16}H_6Cl_4O_8$

| | C | H | Cl |
|---|---|---|---|
| Calculated (%): | 41.06 | 1.29 | 30.30 |
| Found (%): | 40.93 | 1.34 | 29.91 |

Synthesis Example 7 (Synthesis of the exemplified compound 41)

A mixture of 29 g of 2-(o-methylphenoxy)-3-chloromalealdehydic acid and 7.3 g of succinic acid chloride is heated at 120°C. for 2 hours. After completion of the reaction, the reaction liquid is allowed to cool. The resulting solidified product is recrystallized from ethyl alcohol to obtain 19.5 g of the desired compound.

Elementary analysis for $C_{26}H_{20}Cl_2O_{10}$

| | C | H | Cl |
|---|---|---|---|
| Calculated (%): | 55.43 | 3.58 | 12.59 |
| Found (%): | 55.29 | 3.47 | 12.48 |

For the hardening of gelatin films of a light-sensitive silver halide photographic material, the hardener according to the present invention is incorporated into such layers, composed mainly of gelatin as, for example, sub layer, emulsion layer, inter layer, protective layer and backing layer, of the photographic material which are gelatin films. Alternatively, a photographic material having said layers may be dipped in a solution containing the hardener of the present invention. Further, the photographic material may be treated with the hardener of the present invention either before, during or after development. If necessary the hardener of the present invention may be used in combination with other hardener within such an extent as not to injure the effects of the invention.

In incorporating the hardener of the present invention into the layers of a light-sensitive silver halide photographic material, the hardener may be formed into a solution in one or more of water and such conventional organic solvents as methanol, dimethyl formamide, ketone, etc. and then added to a coating liquid for forming each of said layers. It is also possible to overcoat the said hardener solution on the upper-most one of the said layers.

The amount of the hardener to be added to the coating liquid for forming gelatin film varies depending on the kind, physical properties, photographic properties, etc. of the objective gelatin film, but is ordinarily from 0.01 to 100% by weight, preferably from 0.1 to 10% by weight, based on the dry weight of gelatin in the coating liquid. The hardener may be added at any stage during preparation of the coating liquid. To a silver halide emulsion, for example, the hardener is preferably added after second ripening of the emulsion.

Light-sensitive silver halide photographic materials, to which the present invention is applicable, include all such light-sensitive photographic materials as, for example, black-white, color and pseudocolor photographic materials, and ordinary, printing, X-ray-sensitive and radiation-sensitive photographic materials, which may be any of negative, positive, direct positive and the like types.

Silver halide emulsions used in the above-mentioned light-sensitive silver halide photographic materials may contain as sensitive components all kinds of silver halides such as silver chloride, silver iodide, silver bromide, silver iodobromide, silver chlorobromide, silver chloroiodobromide, etc. These emulsions may be subjected to various chemical sensitization such as noble metal sensitization using salts of noble metals such as ruthenium, rhodium, palladium, iridium, platinum, gold, etc., e.g., ammonium chloropalladate, potassium chloroplatinate, potassium chloropalladite, potassium chloroaurate, etc., sulfur sensitization using sulfur compounds, reduction sensitization using stannous salts, polyamines, etc., and sensitization using polyalkylene oxide type compounds, or to optical sensitization using cyanine, merocyanine and the like dyes. Further, the emulsions may be incorporated with couplers, stabilizers, e.g., mercury, triazole, azaindene, benzothiazolium and zinc compounds, wetting agents, e.g., dihydroxyalkanes, film-modifiers comprising water-dispersible, fine granular polymeric substances obtained by emulsion polymerization, coating aids, e.g., saponin and polyethylene glycol lauryl ether, and the like various photographic additives.

When applied to gelatin films of a light-sensitive silver halide photographic material, the hardener of the present invention displays an effective hardener ability without deteriorating such photographic properties as speed or fog formation of the photographic emulsion. Further, the hardener scarcely causes post-hardening due to incubation to make it possible to obtain a light-sensitive photographic material stabilized in quality. Even when the light-sensitive photographic material is stored over a long period of time, the hardener not only makes the photographic material more stable without any detrimental effect on the photographic emulsions but also shows such excellent hardening action as to sufficiently withstand high temperature quick treatment and automatic treatment.

The present invention is illustrated in more detail below with reference to examples, but the modes of practice of the present invention are not limited to the examples, and various modifications are possible within the scope of the invention.

EXAMPLE 1

A neutral silver iodobromide emulsion for negative containing 1.5 mol% silver iodide was incorporated with a gold sensitizer, and subjected to a second ripening. The emulsion after ripening was divided into 7 portions. One of the portions was coated, as it was, onto a polyester film base and then dried to prepare a control sample. Six portions of the emulsion thus remained were incorporated individually with methanol solutions each containing the exemplified compound (4), exemplified compound (9), and mucochloric acid as a control compound, the amount of each of said compounds being shown in Table 1 as the number of moles per 1 g of gelatine contained in the emulsion. The portions thus treated were individually coated onto a polyester film base and then dried to prepare samples.

The control sample and 6 kinds of samples were measured for their respective hardening characteristics according to the procedure as mentioned below. That is, each of these samples after coating and drying was stored at 25°C. and 55% RH for one day (24 hours), and was then immersed into a 3% aqueous sodium carbonate monohydrate solution kept at 65°C. to measure an immersion time before the gelatine film began to dissolve. Separately, these samples after coating and drying were stored individually at 25°C. and 55% RH for one day, for 30 days under the same conditions as above, and were subjected to heat treatment at 50°C. and 80% RH for 2 days. Each of the samples thus treated was immersed into a 3% aqueous sodium carbonate monohydrate solution and, immediately thereafter, the surface of the gelatine film was wiped off. The film surface thus wiped off was scratched with a sapphire needle having a pin point of 1 mm in radius to measure a load(g) applied to the needle at the time when scratches began to form on the film surface. The value of the load thus measured was taken as a film surface strength of each sample. In addition thereto, the samples after coating and drying were individually stored at 25°C. and 55% RH for one day, and characteristics of photographic emulsion of each sample were measured according to the procedure as provided for in JIS for speed and fogging thereof. The results obtained in the above measurements were as shown in Table 1. In the said table, speed of each sample was represented by a relative value when that of the control sample was taken as 100.

Table 1

| Compound | Amount of compound added (mol/l g gelatine) | Hardening characteristics: Time required for initiation of dissolution (min.) | Film surface strength (g): Stored for 1 day | Stored for 30 days | Heat treated for 2 days | Characteristics of photographic emulsion: Speed | Fog |
|---|---|---|---|---|---|---|---|
| — | — | 1 | 5 | 8 | 15 | 100 | 0.12 |
| Mucochloric acid | $0.5 \times 10^{-4}$ | 4 | 53 | 100 | 165 | 76 | 0.10 |
| Mucochloric acid | $1 \times 10^{-4}$ | 6 | 66 | 120 | 185 | 71 | 0.10 |
| Exemplified compound (4) | $0.5 \times 10^{-4}$ | 11 | 120 | 145 | 180 | 94 | 0.10 |
| Exemplified compound (4) | $1 \times 10^{-4}$ | 17 | 140 | 165 | 200 | 92 | 0.10 |
| Exemplified compound (9) | $0.5 \times 10^{-4}$ | 25 | 150 | 160 | 200 | 95 | 0.10 |
| Exemplified compound (9) | $1 \times 10^{-4}$ | more than 30 | 180 | 200 | 230 | 91 | 0.10 |

As is clear from the results shown in Table 1, the compounds of the present invention have extremely excellent hardening activity without deteriorating characteristics of photographic emulsion and, in addition, they are less in post-hardening due to storage under ambient conditions and to heat treatment, compared with the control compound.

EXAMPLE 2

A green sensitive high speed silver iodobronide emulsion for color photography containing 3 mol% of silver iodide was subjected to a second ripening. Thereafter, the emulsion was incorporated with 1-(4'-phenoxy-3'-sulfophenyl)-3-heptadecyl-5-pyrazolone as a magenta coupler, and was then divided into 7 portions. Six portions of the emulsion thus divided were incorporated individually with methanol solutions each containing the exemplified compound (10), exemplified compound (16), and mucochloric acid as a control compound, the amount of each of said compounds being shown as in Table 2 as the number of moles per 1 g of gelatine contained in the emulsion. Thereafter, the portion which had not been incorporated with the magenta coupler and 6 portions thus incorporated were coated individually onto a cellulose triacetate film base and then dried. Thus, a control sample containing no hardening agent and 6 kinds of samples each containing a hardening agent were obtained. Each sample was measured according to a procedure similar to that of Example 1 for its hardening characteristics. With respect to characteristics of photographic emulsion of each sample were measured by subjecting said sample to color development treatment with a color developer containing diethyl-p-phenylenediamine as the main ingredient subsequently subjecting the treated sample according to ordinary procedures to bleaching, fixing and water washing and then to sensitometry. The results obtained in the respective treatments above were as shown in Table 2. In the said table, speed of each sample was represented by a relative value when that of the control sample was taken as 100.

Table 2

| Compound | Amount of compound added (mol/l g gelatine) | Hardening characteristics: Time required for initiation of dissolution (min.) | Film surface strength (g): Stored for 1 day | Stored for 30 days | Heat treated for 2 days | Characteristics of photographic emulsion: Speed | Fog |
|---|---|---|---|---|---|---|---|
| — | — | 1 | 5 | 8 | 14 | 100 | 0.11 |
| Mucochloric acid | $0.5 \times 10^{-4}$ | 3 | 49 | 95 | 160 | 76 | 0.10 |
| Mucochloric acid | $1 \times 10^{-4}$ | 5 | 60 | 110 | 180 | 72 | 0.10 |
| Exemplified compound (10) | $0.5 \times 10^{-4}$ | 16 | 135 | 145 | 180 | 91 | 0.10 |
| Exemplified compound (10) | $1 \times 10^{-4}$ | 25 | 160 | 175 | 205 | 87 | 0.10 |
| Exemplified compound (16) | $0.5 \times 10^{-4}$ | 9 | 110 | 135 | 165 | 95 | 0.10 |
| Exemplified compound (16) | $1 \times 10^{-4}$ | 14 | 125 | 150 | 190 | 92 | 0.10 |

As is clear from the results shown in Table 2, the compounds of the present invention have excellent hardening activity similar to that obtained in Example 1. It has also been confirmed that the present compounds do not inhibit at all color development of the coupler and, in addition, they do not bring about any color stain.

EXAMPLE 3

A 5% aqueous gelatine solution was divided into 7 portions. Six portions of the solution thus divided were incorporated individually with methanol solutions each containing the exemplified compound (23), exemplified compound (28), and mucochloric acid as a control compound, the amount of each of said compounds being shown in Table 3 as the number of moles per 1 g of gelatine. The gelatine solutions including the portion which had not been incorporated with any of the aforesaid compounds and 6 portions thus incorporated were individually coated onto a polyester film base and dried. Thus, there were obtained a control sample containing no hardening agent and 6 kinds of samples each containing the aforesaid hardening agent. Each of these samples was measured according to a procedure similar to that of Example 1 for its hardening characteristics to obtain the results as shown in Table 3.

Table 3

| Compound | Amount of compound added (mol/l g gelatine) | Hardening characteristics: Time required for initiation of dissolution (min.) | Film surface strength (g): Stored for 1 day | Stored for 30 days | Heat treated for 2 days |
|---|---|---|---|---|---|
| — | — | 1.5 | 4 | 8 | 14 |
| Mucochloric acid | $0.5 \times 10^{-4}$ | 5 | 50 | 105 | 190 |
| Mucochloric acid | $1 \times 10^{-4}$ | 8 | 65 | 120 | 205 |
| Exemplified compound (23) | $0.5 \times 10^{-4}$ | 12 | 120 | 135 | 215 |
| Exemplified compound (23) | $1 \times 10^{-4}$ | 17 | 145 | 165 | 235 |
| Exemplified compound (28) | $0.5 \times 10^{-4}$ | 13 | 130 | 145 | 190 |
| Exemplified compound (28) | $1 \times 10^{-4}$ | 19 | 160 | 180 | 210 |

As is clear from the results shown in Table 3, the compound of the present invention have excellent hardening activity, and gelatine films hardened thereby are high in film surface strength and the surface thereof will not suffer serious damage from severe mechanical rubbing.

EXAMPLE 4

A neutral silver iodobromide emulsion for negative containing 1.5 mol% silver iodide was incorporated with a gold sensitizer, and subjected to a second ripening. The emulsion after ripening was divided into 7 portions. One of the portions was coated, as it was, onto a polyester film base and then dried to prepare a control sample. Six portions of the emulsion thus remained were incorporated individually with methanol solutions each containing the exemplified compound (29), exemplified compound (33), and mucochloric acid as a control compound, the amount of each of said compounds being shown in Table 4 as the number of moles per 1 g of gelatine contained in the emulsion.

The portions thus treated were individually coated onto a polyester film base and then dried to prepare samples.

The control sample and 6 kinds of samples were measured for their respective hardening characteristics according to the procedure as mentioned below. That is, each of these samples after coating and drying was stored at 25°C. and 55% RH for one day (24 hours), and was then immersed into a 3% aqueous sodium carbonate monohydrate solution kept at 65°C. to measure an immersion time before the gelatine film began to dissolve. Separately, these samples after coating and drying were stored individually at 25°C. and 55% RH for one day, for 30 days under the same conditions as above, and were subjected to heat treatment at 50°C. and 80% RH for 2 days. Each of the samples thus treated was immersed into a 3% aqueous sodium carbonate monohydrate solution and, immediately thereafter, the surface of the gelatine film was wiped off. The film surface thus wiped off was scratched with a sapphire needle having a pin point of 1 mm in radius to measure a load(g) applied to the needle at the time when scratches began to form on the film surface. The value of the load thus measured was taken as a film surface strength of each sample. In addition thereto, the samples after coating and drying were individually stored at 25°C. and 55% RH for one day, and characteristics of photographic emulsion of each sample were measured according to the procedure as provided for in JIS for speed and fogging thereof. The results obtained in the above measurements were as shown in Table 4. In the said table, speed of each sample was represented by a relative value when that of the control sample was taken as 100.

they are less in post-hardening due to storage under ambient conditions and to heat treatment, compared with the control compound.

EXAMPLE 5

A green sensitive high speed silver iodobromide emulsion for color photography containing 3 mol% of silver iodide was subjected to a second ripening. Thereafter, the emulsion was incorporated with 1-(4′-phenoxy-3′-sulfophenyl)-3-heptadecyl-5-pyrazolone as a magenta coupler, and was then divided into 7 portions. Six portions of the emulsion thus divided were incorporated individually with methanol solutions each containing the exemplified compound (35), exemplified compound (41), and mucochloric acid as a control compound, the amount of each of said compounds being shown as in Table 5 as the number of moles per 1 g of gelatine contained in the emulsion. Thereafter, the portion which had not been incorporated with the magenta coupler and 6 portions thus incorporated were coated individually onto a cellulose triacetate film base and then dried. Thus, a control sample containing no hardening agent and 6 kinds of samples each containing a hardening agent were obtained. Each sample was measured according to a procedure similar to that of Example 4 for its hardening characteristics. With respect to characteristics of photographic emulsion of each sample were measured by subjecting said sample to color development treatment with a color developer containing diethyl-p-phenylenediamine as the main ingredient subsequently subjecting the treated sample according to ordinary procedures to bleaching, fixing and water washing and then to sensitometry. The re- Table 4

| Compound | Amount of compound added (mol/l g gelatine) | Hardening characteristics: Time required for initiation of dissolution (min.) | Film surface strength (g): Stored for 1 day | Stored for 30 days | Heat treated for 2 days | Characteristics of photographic emulsion: Speed | Fog |
|---|---|---|---|---|---|---|---|
| — | — | 1 | 5 | 8 | 15 | 100 | 0.12 |
| Mucochloric acid | 0.5 × $10^{-4}$ | 4 | 55 | 100 | 165 | 75 | 0.11 |
| Mucochloric acid | 1 × $10^{-4}$ | 5 | 65 | 120 | 185 | 72 | 0.10 |
| Exemplified compound (29) | 0.5 × $10^{-4}$ | 11 | 110 | 120 | 220 | 95 | 0.11 |
| Exemplified compound (29) | 1 × $10^{-4}$ | 16 | 140 | 160 | 235 | 91 | 0.10 |
| Exemplfied compound (33) | 0.5 × $10^{-4}$ | 11 | 90 | 105 | 210 | 93 | 0.11 |
| Exemplified compound (33) | 1 × $10^{-4}$ | 14 | 125 | 140 | 235 | 88 | 0.10 |

As is clear from the results shown in Table 4, the compounds of the present invention have extremely excellent hardening activity without deteriorating characteristics of photographic emulsion and, in addition, sults obtained in the respective treatments above were as shown in Table 5. In the said table, speed of each sample was represented by a relative value when that of the control sample was taken as 100.

Table 5

| Compound | Amount of compound added (mol/l g gelatine) | Hardening characteristics: Time required for initiation of dissolution (min.) | Film surface strength (g): Stored for 1 day | Stored for 30 days | Heat treated for 2 days | Characteristics of photographic emulsion: Speed | Fogging |
|---|---|---|---|---|---|---|---|
| — | — | 1 | 5 | 7 | 14 | 100 | 0.12 |
| Mucochloric acid | 0.5 × $10^{-4}$ | 4 | 50 | 100 | 160 | 77 | 0.11 |
| Mucochloric acid | 1 × $10^{-4}$ | 6 | 65 | 110 | 185 | 73 | 0.11 |
| Exemplified compound (35) | 0.5 × $10^{-4}$ | 15 | 140 | 150 | 180 | 95 | 0.11 |
| Exemplified | | | | | | | |

Table 5-continued

| Compound | Amount of compound added (mol/l g gelatine) | Hardening characteristics: Time required for initiation of dissolution (min.) | Film surface strength (g): Stored for 1 day | Film surface strength (g): Stored for 30 days | Film surface strength (g): Heat treated for 2 days | Characteristics of photographic emulsion: Speed | Characteristics of photographic emulsion: Fogging |
|---|---|---|---|---|---|---|---|
| compound (35) | 1 × $10^{-4}$ | 25 | 160 | 175 | 200 | 92 | 0.10 |
| Exemplified compound (41) | 0.5 × $10^{-4}$ | 12 | 100 | 120 | 190 | 93 | 0.11 |
| Exemplified compound (41) | 1 × $10^{-4}$ | 16 | 135 | 150 | 215 | 90 | 0.10 |

As is clear from the results shown in Table 5, the compounds of the present invention have excellent hardening activity similar to that obtained in Example 4. It has also been confirmed that the present compounds do not inhibit at all color development of the coupler and, in addition, they do not bring about any color stain.

EXAMPLE 6

A 5% aqueous gelatine solution was divided into 7 portions. Six portions of the solution thus divided were incorporated individually with methanol solutions each containing the exemplified compound (30), exemplified compound (39), and mucochloric acid as a control compound, the amount of each of said compounds being shown in Table 6 as the number of moles per 1 g of gelatine. The gelatine solutions including the portion which had not been incorporated with any of the aforesaid compounds and 6 portions thus incorporated were individually coated onto a polyester film base and dried. Thus, there were obtained a control sample containing no hardening agent and 6 kinds of samples each containing the aforesaid hardening agent. Each of these samples was measured according to a procedure similar to that of Example 4 for its hardening characteristics to obtain the results as shown in Table 6.

Table 6

| Compound | Amount of compound added (mol/l g gelatine) | Hardening characteristics: Time required for initiation of dissolution (min.) | Film surface strength (g): Stored for 1 day | Film surface strength (g): Stored for 30 days | Film surface strength (g): Heat treated for 2 days |
|---|---|---|---|---|---|
| — | — | 1 | 5 | 8 | 15 |
| Mucochloric acid | 0.5 × $10^{-4}$ | 5 | 50 | 100 | 190 |
| Mucochloric acid | 1 × $10^{-4}$ | 7 | 65 | 120 | 200 |
| Exemplified compound (30) | 0.5 × $10^{-4}$ | 10 | 105 | 125 | 210 |
| Exemplified compound (30) | 1 × $10^{-4}$ | 15 | 135 | 155 | 230 |
| Exemplified compound (39) | 0.5 × $10^{-4}$ | 13 | 125 | 145 | 200 |
| Exemplified compound (39) | 1 × $10^{-4}$ | 18 | 160 | 190 | 220 |

As is clear from the results shown in Table 6, the compound of the present invention have excellent hardening activity, and gelatine films hardened thereby are high in film surface strength and the surface thereof will not suffer serious damage from severe mechanical rubbing.

What we claim is:

1. A process for hardening photographic gelatin which comprises reacting photographic gelatin with a compound of the general formula

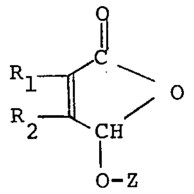

wherein $R_1$ is selected from the group consisting of halogen, substituted- and unsubstituted- aryloxy and -arylthio, $R_2$ is halogen, Z is selected from the group consisting of —X—Y and

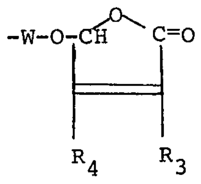

wherein X is $(C{=}0)_m$, wherein *m* is 0 or 1, Y is selected from the group consisting of substituted- and unsubstituted- alkyl, -alkenyl and -aryl, W is selected from the group consisting of alkylene,

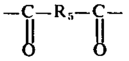

and $-R_6-(-0_6)_n-)$ wherein $R_5$ is selected frm the group consisting of substituted- and unsubstituted- alkylene and -arylene, $R_6$ is selected from the group consisting of substituted and unsubstituted alkylene, *n* is a positive integer, $R_3$ is selected from the group consisting of halogen, substituted- and unsubstituted- aryloxy and -arylthio, and $R_4$ is halogen, provided that when Z is —X—Y, $R_1$ is selected from the group consisting of aryloxy and arylthio.

2. A process for hardening photographic gelatin which comprises reacting photographic gelatin with a compound of the general formula

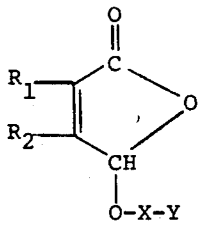

wherein $R_2$ is halogen and wherein $R_1$ is selected from the group consisting of substituted- and unsubstituted-aryloxy and -arylthio, and X is $(C{=}O)_m$ wherein $m$ is 0 or 1, Y is selected from the group consisting of substituted- and unsubstituted- alkyl, -alkenyl and -aryl.

3. A process for hardening photographic gelatin which comprises reacting photographic gelatin with a compound of the general formula

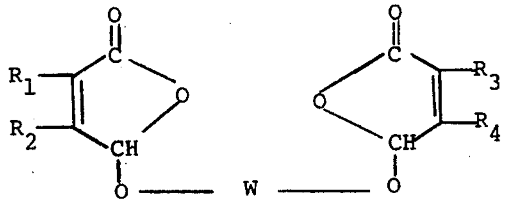

wherein $R_1$ and $R_3$ are each selected from the group consisting of halogen, and substituted- and unsubstituted- aryloxy and -arylthio, $R_2$ and $R_4$ are each halogen and W is selected from the group consisting of alkylene, $$-\underset{\substack{\| \\ O}}{C}-R_5-\underset{\substack{\| \\ O}}{C}-$$

and $-R_6-(-O_6)_n-$, wherein $R_5$ is selected from the group consisting of substituted- and unsubstituted- alkylene and -arylene, $R_6$ is selected from the group consisting of substituted and unsubstituted alkylene, $n$ is a positive integer.

* * * * *